(12) United States Patent
Parodi et al.

(10) Patent No.: US 11,143,784 B1
(45) Date of Patent: Oct. 12, 2021

(54) CHARGING MAT FOR UNMANNED AIRCRAFT

(71) Applicant: Amazon Technologies, Inc., Seattle, WA (US)

(72) Inventors: Carlos Guillermo Parodi, Issaquah, WA (US); Benjamin Martin Schweitzer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 139 days.

(21) Appl. No.: 16/504,559

(22) Filed: Jul. 8, 2019

Related U.S. Application Data

(63) Continuation of application No. 15/711,883, filed on Sep. 21, 2017, now Pat. No. 10,418,830.

(51) Int. Cl.
*G01V 5/00* (2006.01)
*G01T 3/00* (2006.01)

(52) U.S. Cl.
CPC ............ *G01V 5/0091* (2013.01); *G01T 3/008* (2013.01)

(58) Field of Classification Search
None
See application file for complete search history.

(56) References Cited

U.S. PATENT DOCUMENTS

| | | |
|---|---|---|
| 6,056,237 A | 5/2000 | Woodland |
| 7,714,536 B1 | 5/2010 | Silberg et al. |
| 9,075,415 B2 | 7/2015 | Kugelmass |
| 9,315,267 B2 | 4/2016 | Pan et al. |
| 9,630,517 B2 * | 4/2017 | Lee .................... B60L 11/1824 |
| 9,694,906 B1 | 7/2017 | Sadek |
| 9,815,684 B2 | 11/2017 | Kamradt et al. |
| 9,845,165 B2 | 12/2017 | Michalski et al. |
| 9,857,791 B2 | 1/2018 | Krishnamoorthy et al. |
| 10,053,218 B2 | 8/2018 | Feldmann et al. |
| 10,081,263 B2 | 9/2018 | Kim et al. |
| 2016/0347450 A1 | 12/2016 | Raniere |

* cited by examiner

*Primary Examiner* — Edwin C Gunberg
(74) *Attorney, Agent, or Firm* — Lee & Hayes, P.C.

(57) ABSTRACT

Systems for landing and facilitating power flow or data transfer between an unmanned aerial vehicle (UAV) and a charging mat using a boom are described. The system includes a mat with a conductive mesh on the top and a conductive surface on the other bottom of the mat. The conductive mesh and bottom conductive surface are separated (electrically isolated) by an isolation core. The outer portion of the boom contacts part of the conductive mesh of the mat to create an electrical pathway. An inner portion of the boom penetrates through the top layer conductive mesh, through the isolating core, and contacts the bottom conductive surface of the mat to create another electrical pathway.

20 Claims, 15 Drawing Sheets

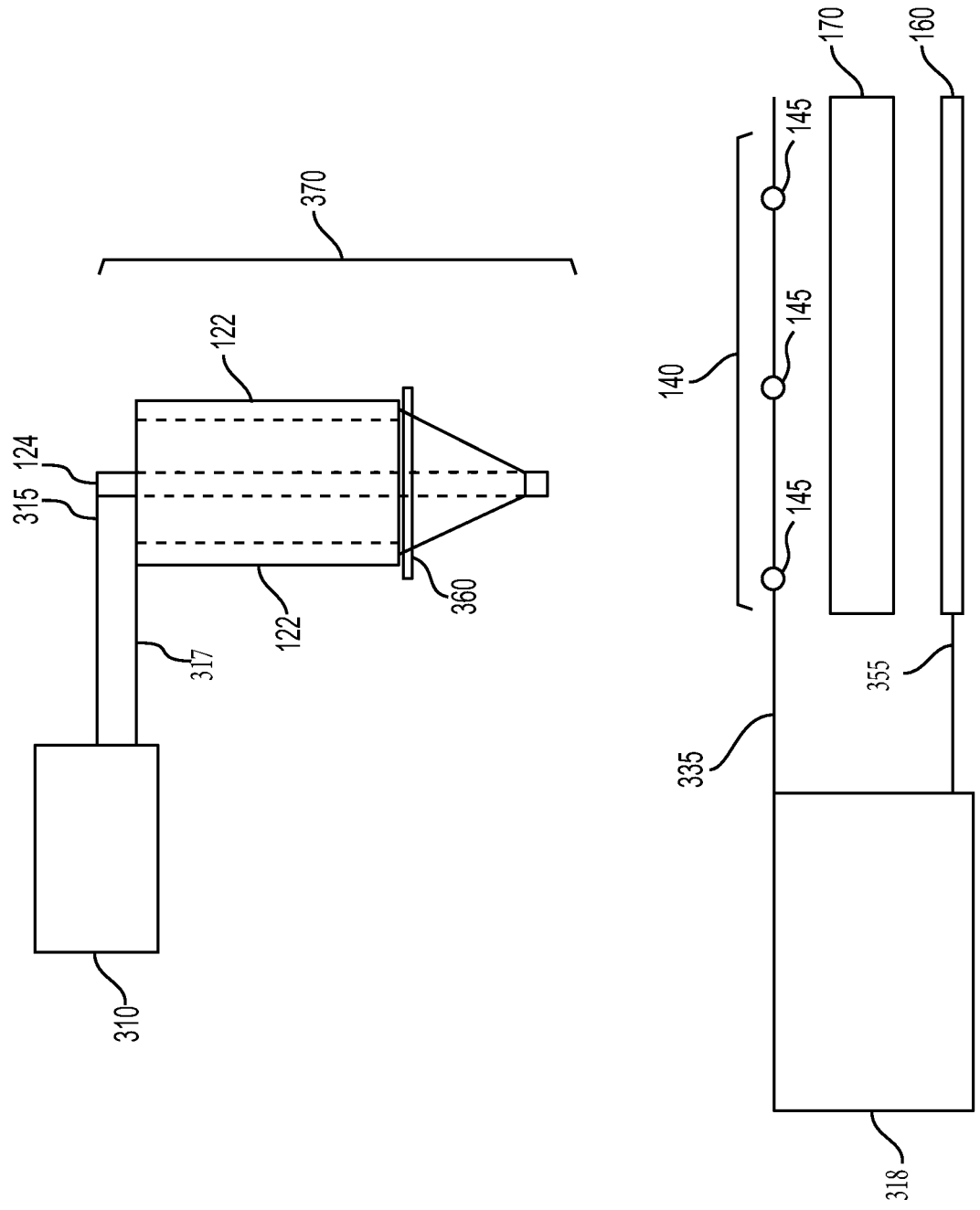

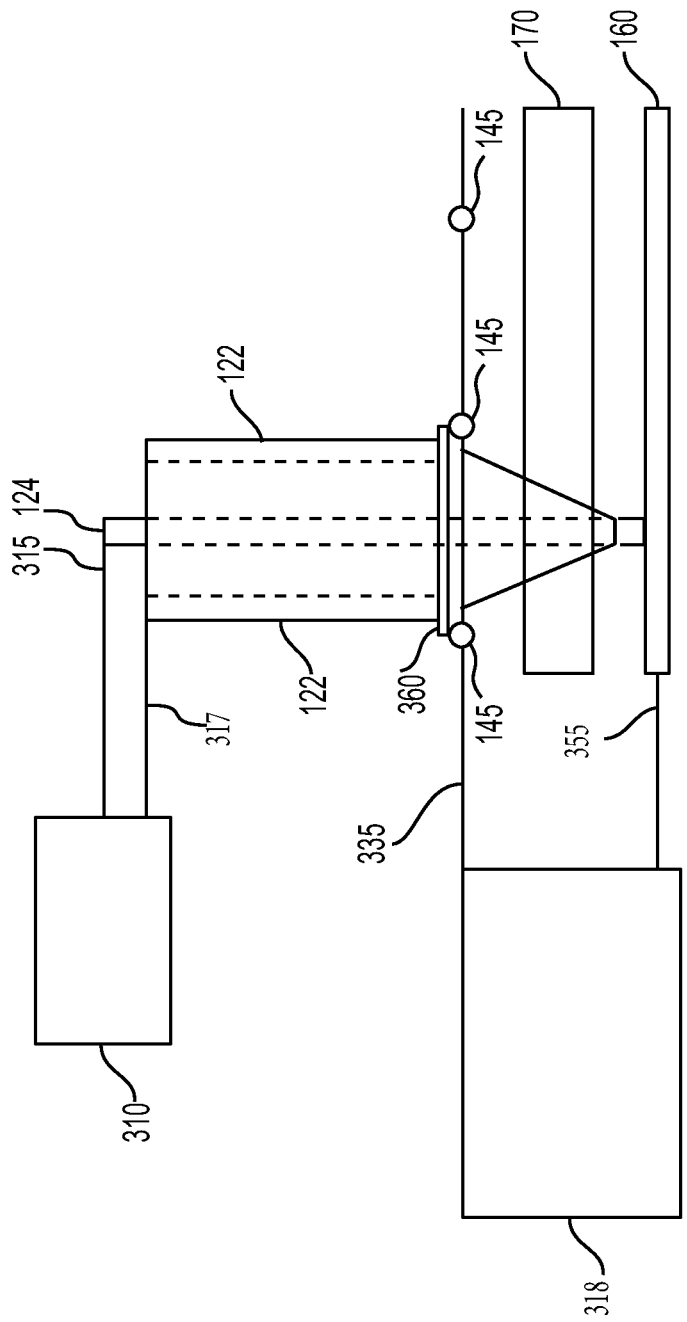

US 11,143,784 B1

CHARGING MAT FOR UNMANNED AIRCRAFT

CROSS-REFERENCE TO RELATED APPLICATION

This application is a continuation of and claims priority to U.S. application Ser. No. 15/711,883, filed on Sep. 21, 2017 and entitled "Charging Mat for Unmanned Aircraft," the entirety of which is incorporated herein by reference.

BACKGROUND

Precision landing of an unmanned aerial vehicle (UAV) for operation and maintenance in a known location may be a challenging task. Many of these UAV are smaller in size and weight as compared to corresponding manned vehicles. Small and lightweight UAV present various challenges in control and operation, depending on environmental conditions. Furthermore, many operations performed on the UAV after landing require substantial human interaction. For example, an operator may be required to physically connect cables to an UAV to charge a battery of the UAV or to transfer of data between the UAV and a computer system.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 3C is an example boom of a UAV before the boom is coupled to a charging mat.

FIG. 3D is an example boom of a UAV coupled to a charging mat.

DETAILED DESCRIPTION

Figure 1:
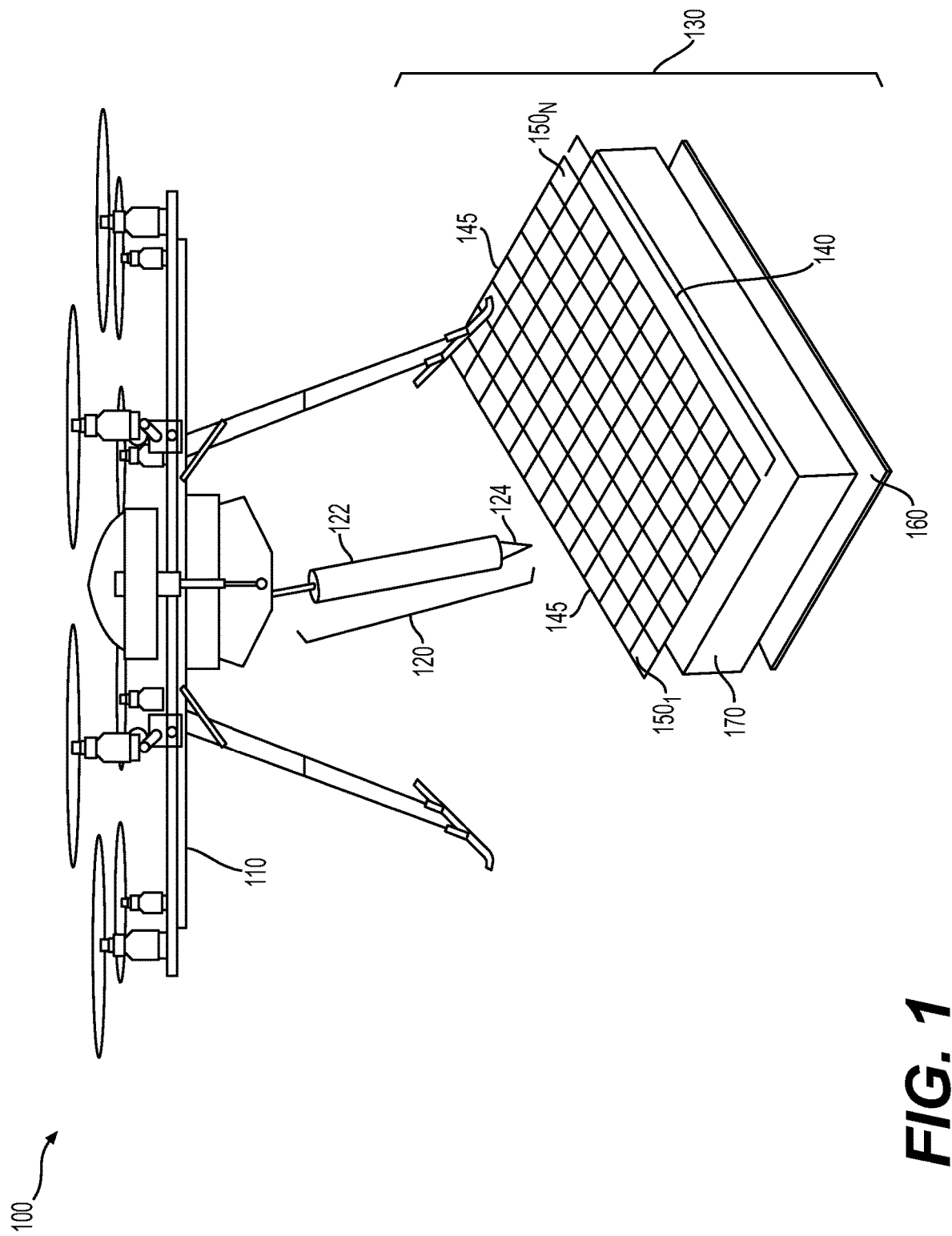
FIG. 1 is a schematic diagram showing an illustrative environment for charging a battery of an unmanned aerial vehicle (UAV) using a charging mat.

Systems and apparatuses for landing and facilitating power flow and/or data transfer between an unmanned aerial vehicle (UAV) and a landing mat using a boom are described. The systems and apparatuses may include a mat with a conductive mesh on the top and a bottom conductive surface on the bottom of the mat. The conductive mesh and the bottom conductive surface may be separated and electrically isolated by an isolation material. The isolation material may be elastic and/or flexible to enable a device to be inserted into the material, possibly to penetrate the material. The outer portion of the boom may contact part of the conductive mesh of the mat to create an electrical pathway. An inner portion of the boom penetrates through the top layer conductive mesh, through the isolation material, and contacts the bottom conductive surface of the mat to create another electrical pathway.

In accordance with one or more embodiments, the illustrative systems and apparatuses implement a charging mat for the UAV. The charging mat includes a conductive mesh. The interconnected conductors of the conductive mesh provide an electrical connection, and the array of apertures between the interconnected conductors in the conductive mesh provide many different individual landing positions for the UAV with respect to the charging mat. Each landing position provides a location for the UAV to couple to the charging mat. Once coupled, the charging mat provides an efficient direct connection for autonomously charging the battery of the UAV. At each landing position in the conductive mesh, the UAV establishes a direct electrical connection to a source, such as a power supply via the conductive mesh layer the functions as one electrical pathway and the bottom conductive surface that functions as another electrical pathway, thereby forming a current loop connecting the source to the battery of the UAV. Each landing position provides the same functionality to the UAV. Precision landing is not required because the UAV need only land within the surface area of the charging mat, rather than at a specific location within the mat.

In some embodiments, the charging mat includes two conductive layers, a top conductive mesh and a bottom conductor layer. The top conductive mesh and the bottom conductor layer are electrically isolated by an isolating core. Following landing of the UAV on the charging mat, a boom from the UAV may penetrate the conductive mesh and the isolating core until the boom reaches the bottom conductor layer. At this point, the boom makes dual electrical contact with the charging mat through the conductive mesh and the bottom conductor layer. Upon making dual electrical contact, power and/or data can be transferred between the unmanned vehicle and a remote device.

In various embodiments, example, the UAV includes a boom for establishing electrical connection with the charging mat. A battery of the UAV may be electrically connected to conductors on the boom. When the UAV lands on the charging mat, the boom couples to the charging mat. In an example, the boom connects with the conductive mesh and a bottom conductor to form a connection with a power supply to charge the battery of the UAV.

The boom may include an outer conductor that surrounds, and is substantially coaxial with, an inner conductor. The inner and outer conductors are electrically isolated from each other forming at least two separate electrical pathways.

In an example, the inner and outer conductors are separated by an insulator. In another example, the inner and outer conductors are separated by an air gap. In yet another example, the inner and outer conductors are separated by a dielectric material. In still other examples, the conductors of the boom are not coaxial, but may be of different geometric orientations relative to each other.

The inner conductor may be movable relative to the outer conductor of the boom. In one position, the inner conductor can be located within the outer conductor such that the end of the inner conductor does not protrude beyond the end of the outer conductor. The inner conductor may be protected from damage or inadvertent contact with other objects when the inner conductor is retracted, or located inside the outer conductor. The inner conductor can also extend outside of the outer conductor. In this position, the inner conductor is positioned to penetrate the isolating core (if necessary) and to contact the charging mat.

The inner conductor may be moved relative to the outer conductor via various types of force applying actuators. In one example, a spring-loaded actuator is compressed when the inner conductor is located at a first or internal position relative to the outer conductor. To move the inner conductor to the second or external position relative to the outer conductor, the spring is released causing the inner conductor to move outside of the outer conductor. Besides moving the inner conductor, the actuator also facilitates the probe's penetration of the isolating core of the charging mat. Example actuators include linear actuators, linkage actuators, and other actuators known in the art. Example linear actuators for moving the inner conductor include pneumatic actuators, piezoelectric actuators, stepper motors, solenoids, or other comparable devices.

In another example, the boom may be fabricated with the inner conductor protruding beyond the outer conductor. In this case, the inner conductor may be located at a fixed position external to the outer conductor obviating the need for an actuator to move the inner conductor. An actuator may be used, however, for the inner conductor to penetrate the insolating core of the charging mat.

The end of the boom through which the inner conductor protrudes may be configured using various types of geometry. For example, the end may be conical shape whose cross-sectional area decreases as the cone reaches the end of the boom. This geometry allows for the boom to enter an aperture within a conductive mesh until the outer geometry of the boom exceeds the dimensions of the respective aperture. In an example, the end of the boom may be a cylinder whose diameter remains relatively constant. Other geometries may be used based on the geometry of the conductive mesh.

The inner and outer conductors of the boom may be connected to a battery of the UAV for charging the battery. The inner and outer conductors of the boom may also be used for unidirectional or bidirectional data transfer between the UAV and a remote device. In one example, the boom may have one or more additional conductors allowing transfer of data between the UAV and a remote device.

In an example, the landing mat includes a top conductive mesh and a bottom conductive layer separated by an isolating core. The top conductive mesh includes interconnecting conductors that form a conductor. The mesh can be of any geometrical pattern, including circles, squares, rectangles, pentagons, hexagons, etc., and combinations of these. The mesh may be rigid or pliable. The spaces or apertures between the conductors of the mesh may provide a self-adjusting location for the boom to enter. The outer conductor of the boom can contact the mesh, and is held in position by adjacent conductors in the mesh corresponding to the space in which the boom entered.

The isolating core of the mesh electrically separates the top conductive mesh from the bottom conductive layer of the charging mat. The isolating mesh may include one or more conductive mesh layers. The isolating core provides a surface through which the inner conductor of the boom penetrates. In an example, the core may be flexible and may be pierced by the boom. In another example, the core may be foam. In another example, the core is a honeycomb structure allowing the boom to pass through without piercing the core. In an example, the honeycomb structure is of similar geometry as the conductive mesh. Additional conductive mesh layers may be added to selectively couple with a conductor of a specific cross sectional area or size.

In an example, the inner and outer conductors of the boom may be coupled to the battery of the UAV. After landing and contact is made between the boom and the charging mat, the battery of the UAV can be charged by a power supply connected to the top conductive mesh and bottom conductor of the charging mat.

The UAV may store data before, during, or after a flight. Furthermore, the UAV may include software to be updated or uploaded. Coupling the boom to the landing mat allows for unidirectional or bidirectional transfer of data between the UAV and a remote device. For example, either the inner or outer conductor of the boom may be used as a data channel to transmit data between the UAV and the charging mat. In an example, additional conductors may be added to the boom (and correspondingly, additional mesh layers of the charging mat separated by insolating cores) may be used as additional channels to transfer data between the UAV and a remote device. In this fashion, the UAV may transfer data to a remote device after landing on the charging mat, and/or the UAV may receive software or other data from the remote device.

The apparatuses and systems described herein may be implemented in a number of ways. Example implementations are provided below with reference to the following figures.

FIG. 1 is a schematic diagram showing an illustrative environment 100 for charging a battery of an unmanned aerial vehicle (UAV) 110 with charging mat 130. The charging mat includes an array of landing sites allowing a non-precise landing trajectory for the UAV to land and couple to the landing mat for recharging a battery of the UAV.

UAV 110 is depicted with boom 120 for coupling to the landing mat. Boom 120 includes two conductors: outer conductor 122 and inner conductor 124. The outer conductor 122 of boom 120 couples to one electrode or conductor of charging mat 130 and inner conductor 124 of boom 120 couples to a second electrode or conductor of charging mat 130.

Conductor 122 in FIG. 1 is disposed over the outer surface of boom 120, and possibly over the entire outer surface. In other examples, outer conductor is disposed over the distal or bottom end of the outer portion of boom 120. In this example, the portion of outer surface of boom 120 that does not couple to interconnected conductors 145 may be fabricated from any material, including an insulating material because the portion of that surface of the boom does not couple to charging mat 130. Boom 120 also includes inner conductor 124 for coupling to an electrode of charging mat 130.

Boom 120 may be retracted inside UAV 110 during UAV operation. Retracting the boom inside UAV 110 provides a controlled environment that may maintain physical integrity of the boom, in addition to a reduction in aerodynamic forces on the boom. As UAV 110 descends toward landing mat 130, boom 120 may be extended from UAV 110. Once extended, conductors 122 and 124 may couple to charging mat 130. In another example, inner conductor 124 is recessed inside outer conductor 122 to maintain physical integrity of inner conductor 124. In this case, inner conductor 124 may be extended so that it protrudes from outer conductor 122, and couples to bottom conductor 160. In still other examples, both boom 120 and inner conductor 124 may be extended for coupling to charging mat 130.

Boom 120 may be extended and/or deployed for various functions. First, the boom may be extended to expose the inner conductor for contact with the bottom conductor of the charging mat. Second, an additional force may be used for the boom to penetrate the isolating core. The boom may be extended by any actuating device. In an example, a linear actuator may be employed to translate boom 120 and/or inner conductor 124. In another example, a linkage system for translating rotational energy into linear displacement may move boom 120 and/or inner conductor 124.

Charging mat 130 of FIG. 1 includes conductive mesh 140 and bottom conductor 160. Conductive mesh 140 may be formed from interconnected conductors 145. Interconnected conductors 145 are arranged in a grid pattern, creating an array of N apertures (labeled $150_1 \ldots 150_N$) between the interconnected conductors 145. The grid pattern may be any geometrical relationship, such as a circle, triangle, square, rectangle, pentagon, hexagon, any polygon, or other geometric shapes, and combinations thereof. Charging mat 130 also includes bottom conductor 160. Bottom conductor 160 is vertically offset or translated from conductive mesh 140 forming a gap. In one example, isolating core 170 is disposed in the gap formed between conductive mesh 140 and bottom electrode 160.

In an example, bottom conductor 160 is oriented substantially parallel to conductive mesh 140. In other examples, bottom conductor 160 and conductive mesh 140 need not be substantially parallel to each other. For example, bottom conductor 160 and conductive mesh 140 may be oriented to form an angle less than 180 degrees. Regardless of the angle, bottom conductor 160 is electrically isolated from conductive mesh 140.

In an example, conductive mesh may be electrically coupled to an external source or load via an electrical lead. Electrical connections to conductive mesh 140 may be made on any portion of interconnected conductors 145. For example, the top surface of interconnected conductor 145 may be coupled to a conductor or lead that is placed on the top surface of conductive mesh 140. The side surface of interconnected conductor 145 may also be fabricated to couple to a conductor or a lead. In still other embodiments, combinations of the top and side surfaces of interconnected conductor 145 may be fabricated to couple to a conductor or lead.

Conductive mesh 140 and bottom conductor 160 can be fabricated from any conductive material that functions as an electrode or that can carry an electrical load. Example materials include gold, silver, copper, tin, aluminum foil or other metals, alloys, or other materials that conduct electricity.

Conductive mesh 140 can be electrically coupled to UAV 110 through any portion of interconnecting conductors 145. For example, electrical connection between UAV 110 and conductive mesh 140 may be made via a conductor attached to UAV 100 interfacing with a portion of the top or side of interconnecting conductors 145. In an example, interconnecting conductors 145 form an array of apertures of geometric patterns for coupling to UAV 110.

Top conductor 145 is not limited to interconnected conductors 145. For example, top conductor may be an array of recessed features on an insulator. The recessed features provide a landing surface for UAV 110. In another example, top conductor includes raised features that provide a landing surface for UAV 110. The raised or recessed feature may be fabricated as geometric shape that can accept and/or support a landing skid of UAV 110.

Charging mat 130 also includes an isolating core 170 disposed between top conductive mesh 140 and bottom conductive layer 160. Isolating core 170 electrically separates top conductive mesh 140 from bottom conductor 160. Isolating core 170 provides a medium through which the boom 120 may penetrate. In an example, isolating core 170 is made from a compressible material that does not conduct electricity, yet provides a scaffold or gap through which an electrode may penetrate and couple to bottom conductor 160.

Figure 2:
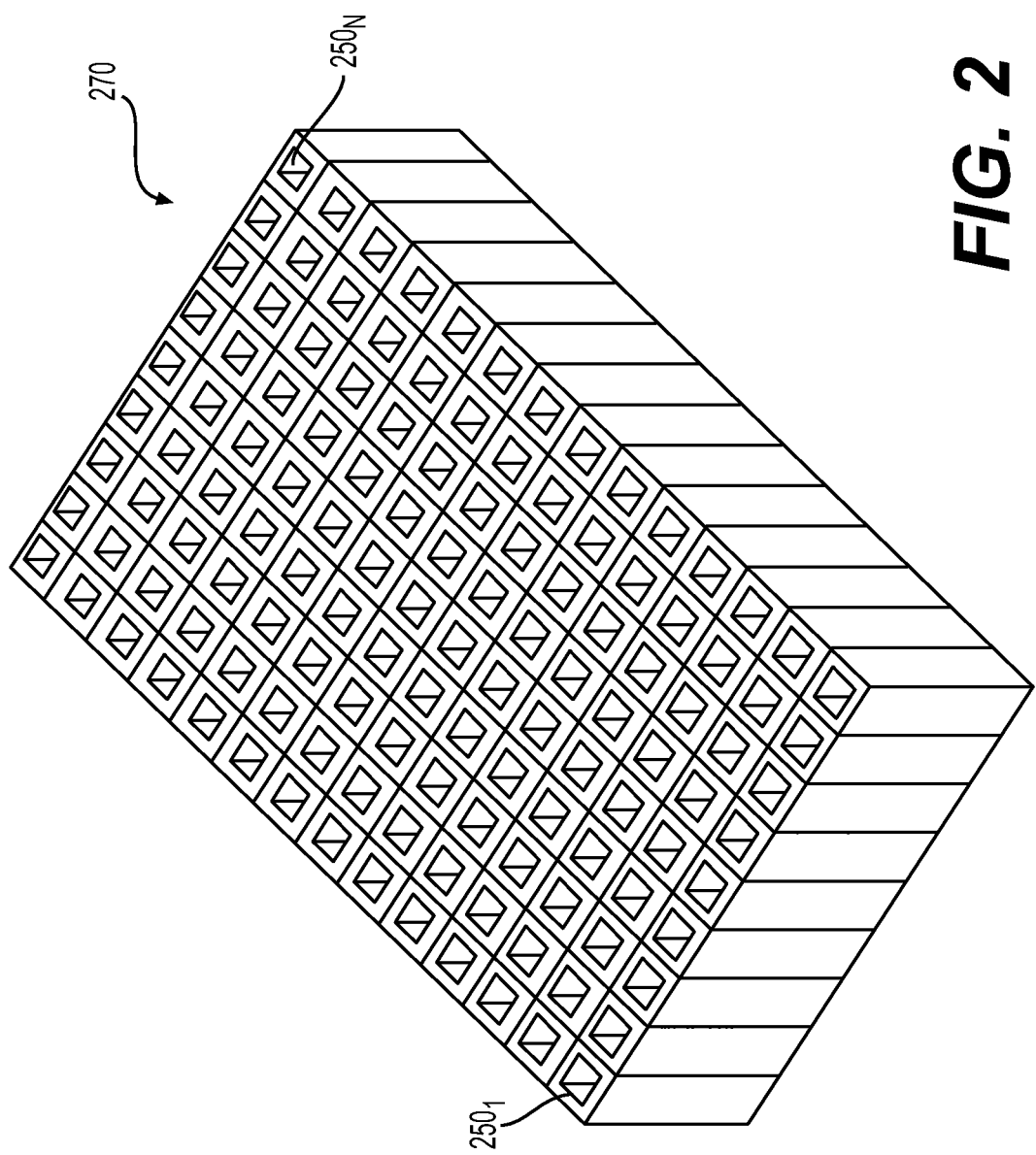
FIG. 2 is an example isolating core for isolating the conductive mesh from the bottom electrode of a charging mat.

FIG. 2 shows an isolating core 270 that is fabricated in a honeycomb geometry that is similar to at least part of the geometry of the grid pattern of conductive mesh 140. The honeycomb pattern of isolating core 270 includes N apertures ($250_1 \ldots 250_N$). Each aperture ($270_1 \ldots 270_N$) provides a coupling location for boom 120. In an example, the apertures of isolating core 270 essentially align with apertures $150_n$ of conductive mesh 140, as shown in FIG. 1. Although the apertures are shown as having square profiles, the apertures of isolating core 270 may be fabricated with other geometries, including circular, triangular, rectangular, polygon, or any other geometric shape, which may or may not be symmetrical.

In this example, inner conductor 124 of boom 120 passes through one of the apertures in the array of apertures and contacts bottom conductor 160 as shown in FIG. 1. Unlike a solid insulating material 170 shown in FIG. 1, the isolating core 270 is not physically pierced by a conductor of boom 120. Because boom 120 penetrates through an aperture in isolating core 270 in the example shown in FIG. 2, rather than through the insulating material itself, use of isolating core 270 may reduce or prevent physical damage to inner conductor 124. The use of isolating core 270 may prevent physical damage to inner conductor 124 of boom 120 during landing. In some applications, the honeycomb pattern for isolating core 270 may result in a longer life span because no mechanical penetration by inner conductor 124 of isolating core 270 occurs.

Returning to FIG. 1, in an example, the charging mat 130 may include an additional isolating core disposed on top of the conductive mesh. An isolating core disposed on top of conductive mesh 145 may prevent inadvertent connection to the conductive mesh, reducing the possibility of an accidental short circuiting or shunting of current on the conductive mesh. A top isolating core may reduce damage to the conductive mesh by minimizing physical or electrical damage. In one example, the top isolating core may be fabricated similar to isolating core 170 shown in FIG. 1. In another example, isolating core 135 may be fabricated as a honeycomb structure similar to isolating core 270 shown in FIG. 2. The use of a honeycomb structure for isolating core 135 removes the need for boom to penetrate a solid core 135 before contacting interconnecting conductors 145. This feature may reduce damage to inner conductor 124, thereby enhancing the lifespan of inner conductor 124.

UAV 110 includes boom 120 that includes outer conductor 122 and inner conductor 124. At least a portion of outer conductor 122 is deposed on the outside of the boom 120 to function as an electrical lead. Outer conductor 122 surrounds at least a portion of inner conductor 124 located at the end of boom 120 that couples to charging mat 130. Outer conductor 122 and inner conductor 124 are separated by insulating material 126. Insulating material 126 is not limited to a specific material, but may be any material that electrically isolates outer conductor 122 and inner conductor 124. For example, insulating material 126 may be any type of insulator, dielectric, or an air gap.

Outer conductor 122 and inner conductor 124 may be coupled to terminals having opposite polarity of an electrical load of UAV 110. In an example, outer conductor 122 is coupled to one terminal of the battery of the UAV and inner conductor 124 is connected to the second terminal of the battery of the UAV. In another example, outer conductor 122 and inner conductor 124 may couple to the same terminal of an electrical load of UAV 110. In an example, one or both of outer conductor 122 and inner conductor 124 may be connected to a data channel of UAV 110.

Figure 3A:
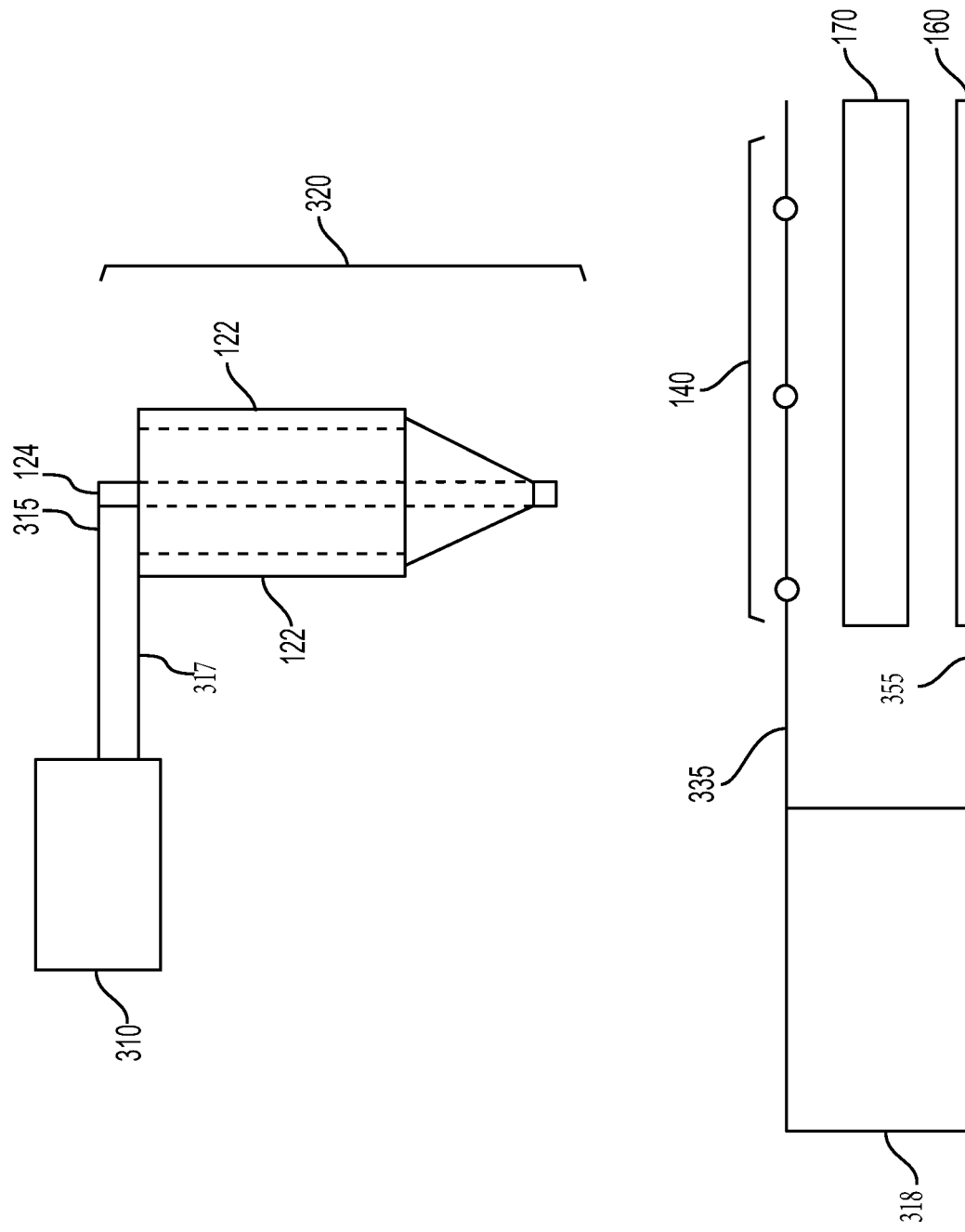
FIG. 3A is an example boom of a UAV before the boom is coupled to a charging mat.

FIG. 3A illustrates an example system showing boom 320 preparing to contact charging mat 130. Boom 320 includes inner conductor 124 and outer conductor 122. In this example, battery 310 is coupled to outer conductor 122 and inner conductor 124 of boom 320 via leads 315 and 317. Boom 320 is shown with inner conductor 124 in a position extending beyond the end of outer conductor 122. The end or tip of inner conductor 124 is flat in shape in FIG. 3A. In other examples, the tip of inner conductor 124 may be conical, spherical, or any or geometry permitting coupling to bottom conductor 160.

A side view of boom 320 is depicted in the top portion of FIG. 3A, and charging mat 130 is depicted in the bottom portion of FIG. 3A. In this view, charging mat 130 includes top conductive mesh 140, bottom conductor 160, and isolating core 170. A cross section of top conductive mesh 140 is shown in FIG. 3A, and the circles denote the interconnected conductors 145 that are perpendicular (or normal) to the plane of FIG. 3A. Top conductive mesh 140 and bottom conductor 160 are coupled to power supply 318 via leads 335. Power supply 318 may be used to recharge a battery of a UAV coupled to the charging mat.

Figure 3B:
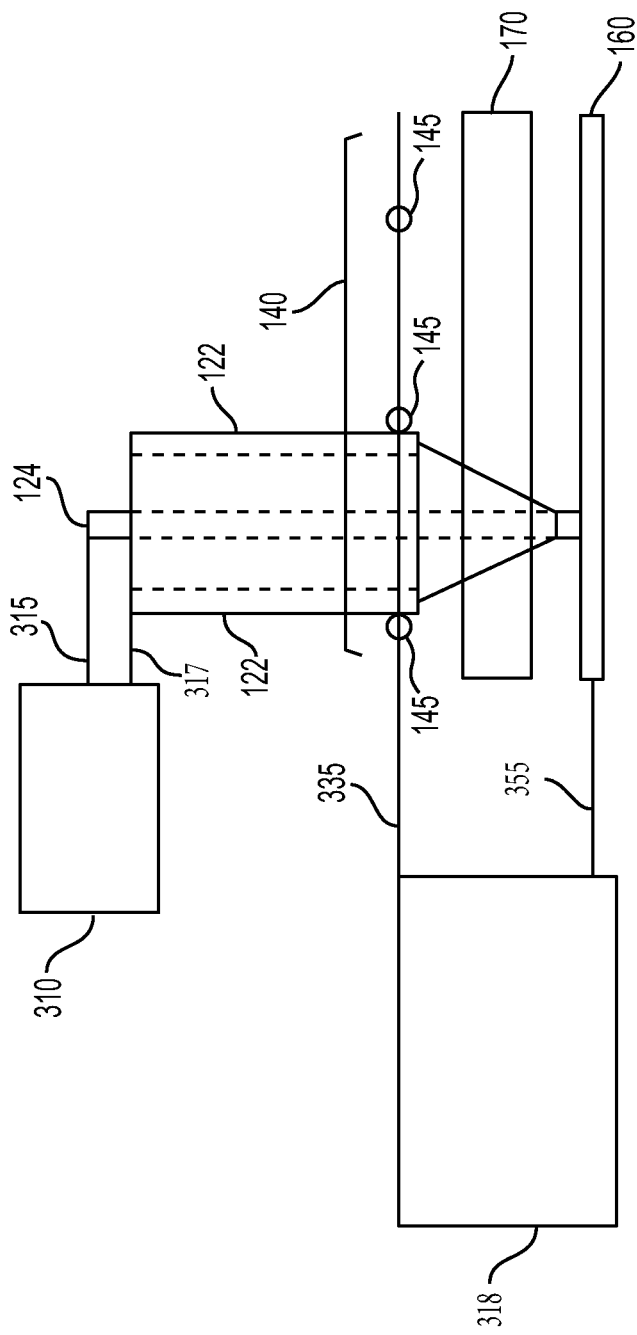
FIG. 3B is an example boom of a UAV coupled to a charging mat.

FIG. 3B shows an example boom of UAV coupled to a charging mat. In this example, the conductors of boom 320 are coupled to the conductors of charging mat 130. Specifically, inner conductor 124 is coupled to bottom conductor 160, and outer conductor 122 is coupled to interconnected conductors 145 defining one aperture for landing on conductive mesh 140. In this example, inner conductor 124, which is coupled to bottom conductor 160, has penetrated one aperture (e.g., 150$_n$) of conductive mesh 140 and isolating core 170. Bottom conductor 160 couples to inner conductor 124 and functions as a limit stop for the boom by stopping the vertical movement of the boom.

When the UAV is coupled to charging mat as shown in FIG. 3B, the charging mat can be used to recharge battery 310 of UAV. In this position, battery 310 of UAV 110 may be charged through top conductive mesh 140 and bottom conductor 160. Battery 310 is coupled to power supply 318 via leads 355 and 335. In this example, the boom of UAV is coupled to the charging mat via outer conductor 122 contacting interconnected conductors 145 of conductive mesh 140 and inner conductor 124 contacting bottom conductor 160. Coupling of the boom with the conductive mesh requires contact between the outer conductor of the boom with the conductive mesh, while maintaining contact between the inner conductor of the boom and the bottom conductor of the charging mat.

The end of the boom that couples with the bottom electrode may comprise various types of geometries. In the example shown in FIGS. 3A and 3B, the end of the boom is tapered and includes a core through which inner electrode 124 protrudes. The tapered end facilitates location placement of the UAV during landing and enhances the rigidity of inner conductor 124 as inner conductor 124 passes through isolating core 170. The end of the inner conductor 124 of the boom in the example shown in FIG. 1 is a cross section of a cylinder. In other examples, the end of inner conductor 124 may taper to a point. In other examples, the end of inner conductor 124 may have a spherical shape. In other examples, the end of inner conductor 124 may include any geometry that facilitates coupling with bottom conductor 160.

The disclosed systems and methods allows a UAV to land with low precision on a landing surface configured to recharge the UAV's battery as described herein. This reduction in precision results from the array of apertures 150 in conductive mesh 140 providing numerous individual landing surfaces, each one of which is an acceptable location for the UAV to land and recharge the battery of the UAV. In the example shown in FIGS. 3A and 3B, the end of the conical tip of boom 320 enters one of the apertures 150 of conductive mesh 140. As boom 320 continues to penetrate aperture 150, the cross-sectional area of boom 320 within aperture 150 in the plane of interconnected conductors 145 increases, and eventually outer conductor 122 contacts interconnected conductors 145 of conductive mesh 140.

In an example, the diameter of boom 320 may be slightly larger than the spacing between interconnected conductors 145 of conductive mesh 140, facilitating adequate coupling between outer conductor 122 and interconnected conductors 145. In this case, inner conductor 124 contacts the side surfaces of interconnected conductors 145. As boom 320 continues to penetrate aperture 150 inner conductor 124 will approach and eventually contact bottom conductor 160. Bottom conductor 160 functions as a limit stop on the vertical traversal of boom 320 and couples with inner conductor 124. The coupling of inner conductor 124 with bottom conductor 160, along with coupling of outer conductor 122 with conductive mesh 140 forms a circuit between the charging mat and the UAV via leads 335, 355, 315, and 317.

A UAV may land with low precision on the disclosed charging pad, because the UAV's boom need only penetrate one aperture of the array of apertures. Rather than landing on a precise point on the charging mat, the UAV may land over any one of the apertures. The charging mat provides many possible sites for the UAV to land and recharge its batteries. This low precision landing allows the UAV to land at an imprecise angle or location on the charging mat. Reducing the landing precision may reduce the operational and design costs of the UAV. In one example, the UAV programmed to land in an area defined by the landing pad, rather than in an area defined by the precision of connecting an electrical lead to the UAV. In an example, the UAV can accurately land to recharge its battery using low precision guidance and control of its landing trajectory, even in the presence of environmental conditions that may further affect its landing trajectory. Additionally, upon landing, the UAV couples to the charging mat creating a circuit to recharge its batteries without the precision that typically is required for recharging a battery of a UAV.

In another example, outer conductor of boom may couple with the top surface of interconnected electrodes of conductive mesh 140 as shown in FIGS. 3C and 3D. In this case, boom 370 includes annular lead 360. In this example, the outer diameter of annular lead 360 may be larger than the diameter of the cylindrical diameter of boom 370. In other examples, the diameter of annular lead 360 may be equal to or smaller than the cylindrical diameter of boom 370. Annular lead 360 couples to the charging mat through contact with the top surface of interconnected conductors 145. In this example shown in FIG. 3D, boom 370 is lowered to the charging mat so that annular lead 360 couples with interconnected electrodes 145 of conductive mesh 140. Annular lead 360 may be coupled to battery 310 via inner conductor 124 and lead 315. In another example, annular lead 360 may be coupled to battery 310 via lead 317. Other methods of coupling annular lead 360 to battery may be used.

Annular lead 360 includes an aperture through which inner conductor 124 passes. As boom 370 couples to landing mat in FIG. 3D, annular lead 360 (which is electrically coupled to outer conductor 122) contacts the top surface of adjacent interconnected electrodes 145, and inner conductor 124 contacts bottom electrode 160. The coupling of the boom to the charging mat in FIG. 3D may include the use of a biasing agent. In an example, annular lead 360 contacts interconnected electrodes 145 before inner conductor 124 contacts bottom conductor 160. In this case, boom 370 may continue to apply a force on conductive mesh 140 causing conductive mesh 140 to bend towards bottom conductor 160. The conductive mesh 140 continues to deform in the presence of increasing force until inner conductor 124 contacts bottom conductor 160. The bias force from the boom in combination the coupling force between interconnected electrodes and annular lead 360 facilitates coupling between boom 370 and the charging mat.

In another example, a bias force may be applied to bottom conductor 160, displacing bottom conductor 160 toward conductive mesh 140. In this case, as boom 370 penetrates conductive mesh 140, inner conductor 124 may contact bottom conductor 160 before outer conductor 122 contacts interconnected electrodes 145. As boom 370 continues to penetrate conductive mesh 140, the forced applied by boom 370 will continue deform bottom conductor 160 until outer conductor 122 contacts interconnected electrode 145. At this point, the boom is coupled to the charging mat via the bias forced applied by the boom and the coupling between the pliable conductive mesh and annular lead 360.

In other examples, conductive mesh 140 may be pliable to enhance coupling with the outer electrode of the boom, while a biasing force may be applied to bottom conductor 160 to enhance the coupling between the inner electrode of the boom and bottom conductor of the charging mat. In other examples, the outer conductor 122 or annular lead 360 may be pliable to facilitate coupling with the charging mat.

In another example, since annular lead 360 contacts interconnected electrodes 145 in the example shown in FIG. 3C, outer conductor 122 may be removed. In this case, annular lead 360 is connected to an electrical load of the UAV such as battery 310 via lead 317. Inner conductor 124 passes through annular lead 360 to contact bottom conductor 160 forming an electrical circuit between the charging mat and the UAV.

Figure 3E:
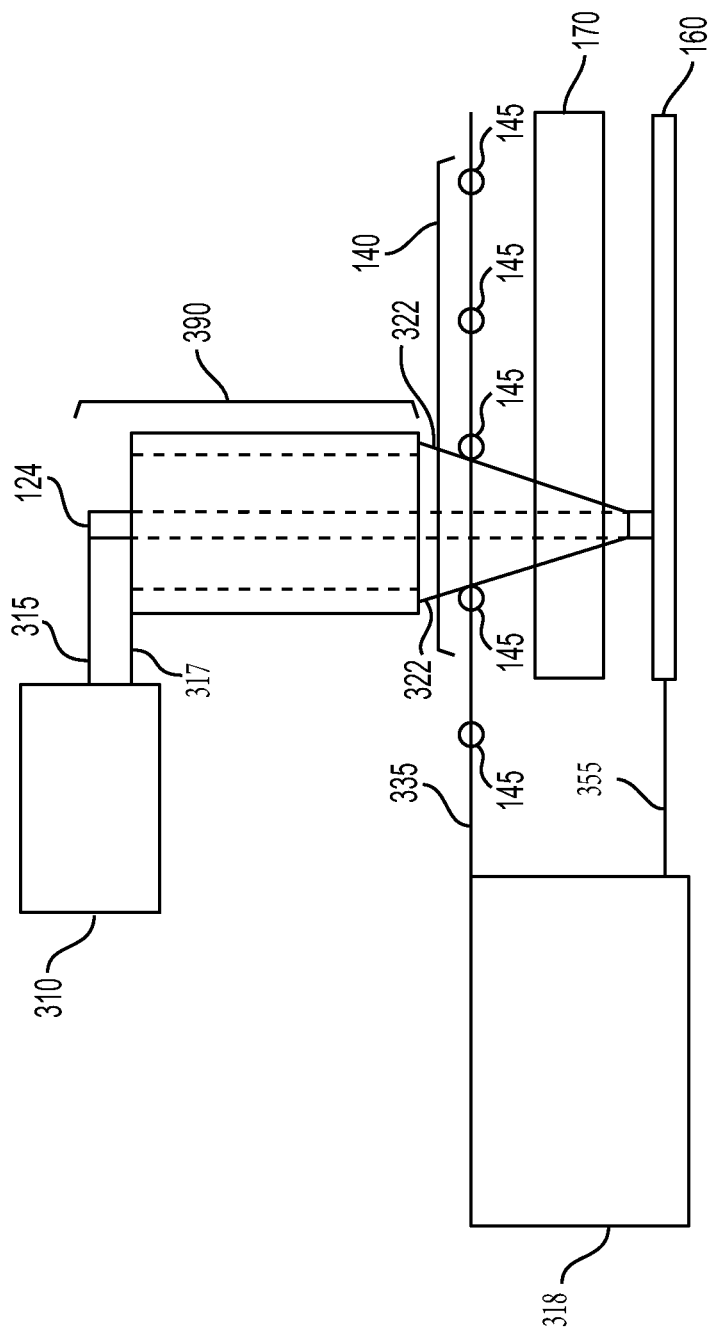
FIG. 3E is an example boom of a UAV coupled to a charging mat.

In an example shown in FIG. 3E a boom may be coupled to a charging mat via the tapered end of a boom. In this case, boom 390 contacts interconnected conductors 145 of conductive mesh 140 through the tapered end 322. In this example, the outer surface of tapered end 322 of boom 390 is an electrical lead coupling with conductive mesh 140. The boom is coupled to the charging mat by causing conical outer conductor 322 to penetrate an aperture between interconnecting electrodes 145 until inner conductor 124 contacts bottom conductor 160. To facilitate coupling, interconnecting electrodes 145 may be pliable and displace outward as outer conductor 322 continues to penetrate the associated aperture. In other examples, outer conductor 322 may be pliable to facilitate coupling. In other examples, a biasing force may be applied to bottom electrode as discussed previously. Coupling between boom 390 and charging mat occurs with outer conductor 322 wedged between interconnected electrodes while inner conductor 124 contacts bottom electrode 160.

In other examples, any portion of the surface of interconnected electrodes 145, including the top, sides, bottom, and another portion or combination thereof, may couple to a boom of an UAV.

In an example, the interconnected conductors of the mesh may be fabricated from a rigid material that does not deform as boom contacts interconnected conductors 145. In this case, the dimensions of the cross-sectional area of outer conductor 122 may closely approximate the dimensions of aperture 150 to maintain electrical contact between outer electrode 122 and interconnected conductors 145. Alternatively, outer conductor 122 of boom 320 may be fabricated from a pliable or elastic material that deforms or bends in response to an applied force. The pliable conductor may exert a force on interconnected conductors to enhance the connection between outer conductor 122 and interconnected conductors 145.

In another example, interconnected conductors 145 of conductive mesh 140 are fabricated from pliable or elastic materials that bend in response to an applied force. The pliable conductors may exert a force on outer conductor of boom facilitating coupling between the boom and the charging mat. A pliable conductive mesh 140 may more closely conform to the shape of outer electrode 124 creating an enhanced electrical connection between outer conductor 122 and interconnected conductors 125 as compared with rigid conductive mesh 140.

In an example, the conductive mesh may be designed to have square apertures for accepting the outer conductor of a boom having a circular diameter. In this case, the length of the side of the square of the aperture may be less than the diameter of the boom, and the diagonal of the square of the aperture may be greater than the diameter of the boom. Such a geometry may enhance contact by the side of the outer conductor of the boom with the conductive mesh. In an example, the boom has an outer diameter of 5 mm, and the interconnected conductors of the conductive mesh are arranged to create square apertures with a side length of approximately 3-4 mm. In other examples, the apertures have a shape approximating circular, arcuate, polygon, or combinations or shapes thereof. The disclosed charging mat may encompass any shape that allows for quick and efficient electrical coupling during landing.

The array of apertures 150 provides an array of landing locations for the UAV. In this fashion, the UAV need only land on one of many apertures 150 on a portion of conductive mesh 140. By landing with the boom entering one of the apertures 150 of conductive mesh 140, the interaction or coupling of the geometry of the boom 320 with the geometry of conductive mesh 140 reduces the required landing precision for the UAV, while at the same time enabling autonomous battery charging via the charging mat. The outer conductor of the boom contacts with, and is held in position by, the adjacent conductors in conductive mesh 140. The spaces or apertures 150 between the conductors of conductive mesh 140 provide self-positioning locations for the boom to couple with the charging mat.

In some examples, the inner conductor 124 may remain in a fixed position, protruding outside of the outer conductor 122 during operation of the UAV. In other examples, it may be desirable for inner conductor 124 to be recessed inside the core of boom 120. When recessed inside the core, inner conductor 124 may be less susceptible to damage during landing. By landing the UAV before the boom penetrates the isolating foam, inner conductor 124 is protected from damage that may occur as the boom is maneuvering to contact the charging mat.

In one example, a biasing force is applied to the boom to couple the boom with the conductive mesh, such as by way of a spring or other biasing devices that causes the boom to move toward the charging mat. The force causes the boom to penetrate the interconnected conductors and an isolating core, if present. This biasing force may be provided during landing of the UAV. In one example, a force applied to the boom may be generated as a combination of the weight of the UAV combined with the downward landing force. In other examples, an additional force may be applied to be boom so that the boom can penetrate isolating core, such as by including a spring or other biasing device to cause the boom, when deployed, to move toward the charging mat with a force capable to cause penetration of the mesh as described herein. In other examples, a force may be applied to the boom when contacting the pliable conductive mesh causing the pliable conductive mesh to bend, facilitating coupling between the boom and the charging mat. In other examples, a force may be applied to offset the biasing force applied to the bottom conductor. In some examples, the applied force may be a combination of forces applied by the UAV during landing and forces applied to the boom.

Forces may be applied to the boom in various configurations. In one example, a force may be applied to the inner conductor 124 causing inner conductor 124 to penetrate isolating core and couple to bottom conductor 160. In other examples, a force may be applied to the entire boom so that the boom conductors move substantially in unison. In other examples, forces may be applied on both inner conductor 124 and the boom.

One example for applying a force to move inner conductor 124 relative to the outer conductor is an actuator. In this case, inner conductor 124 traverses between locations internal to the end of boom and external to boom. When external to the boom, inner conductor 124 protrudes beyond the end of the boom and beyond the end of outer conductor 122. By providing a recessed position at the first location, damage to the second conductor of the probe tip may be minimized as the probe contacts the bottom electrode. The force to the inner conductor may be applied during or after UAV landing. The force to inner conductor may also be applied during and after UAV landing.

In an example, inner conductor 124 is extended outside of the end of the outer conductor before the UAV lands on charging mat. In other examples, the UAV may land on charging mat, and thereafter extend the inner conductor toward the bottom electrode until the inner conductor contacts the bottom electrode. In an example, the inner conductor is moved after landing. In an example, the boom is moved together, maintaining the spatial relationship between the inner and outer electrodes. In other examples, both the boom and the inner electrode may be moved to contact the bottom electrode of the charging pad.

Figure 4A:
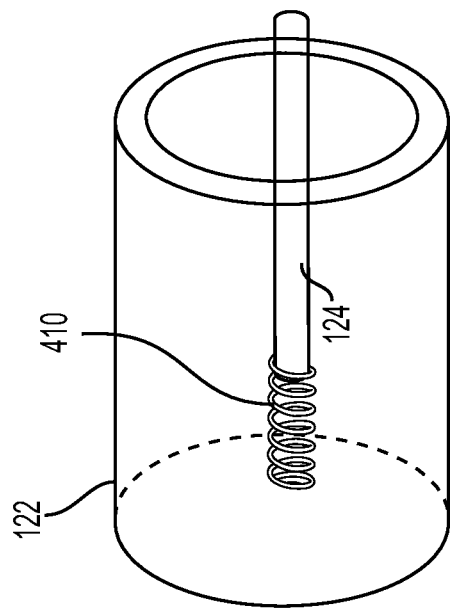
FIG. 4A is an example spring-loaded actuator for moving an inner conductor of the boom, where the inner conductor is shown in the compressed position.
Figure 4B:
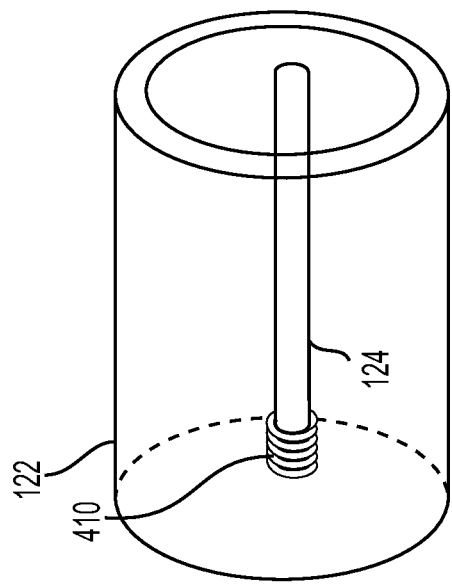
FIG. 4B is an example spring-loaded actuator for moving the inner conductor of the boom, where the inner conductor is shown in the extended position.

In one example shown in FIG. 4A, a spring-loaded actuator including spring 410 or another biasing device (e.g., gas piston, etc.) is compressed to move inner conductor 124 to a first or internal position. In this position, inner conductor 124 does not protrude beyond the end of outer conductor 122. Spring 410 may be compressed through various mechanisms, including a motor activated compression. To move inner conductor 124 to the second or external position, the force compressing the spring is released causing spring 410 to move inner conductor 124 outside of the outer conductor 122 as shown in FIG. 4B. In this case, inner conductor 124 protrudes beyond outer conductor 122 to make contact with bottom electrode 160 of charging mat.

In other examples, the actuator may apply a force to outer conductor 122 causing inner conductor 124 and outer conductor 122 to move substantially in unison.

Other actuators may be used to move the inner conductor or the boom, including biasing, pneumatic actuators, piezoelectric actuators, stepper motors, solenoids, and/or other devices that provide similar functionality. In still other examples, the inner conductor may be moved by gravitational force. In still other examples, the boom is moved as a unit with the spatial relationship between the inner conductor and outer conductor remaining fixed. Rotational actuators may also be used individually or in combination with linear actuators for coupling the boom to the charging mat. In other examples, both the boom and the inner conductor may each be moved to couple to the charging mat. In other examples, a linkage actuator may be used to apply a force to the boom.

In another example, the boom may be fabricated with the inner conductor 124 protruding outside from outer conductor 122 as shown in FIG. 1. In this case, the inner conductor may be located at a fixed position external to the outer conductor. In this example, no actuator is required to move the inner conductor because inner conductor 124 is not recessed into, but rather protrudes from outer conductor. However, an actuator may assist inner conductor 124 to penetrate insolating core 170 during landing of the UAV. In other examples, landing forces may be sufficient to couple the boom to the charging mat.

A UAV may capture or store data before, during, and after flight. The UAV may include software or firmware to be updated or uploaded. Coupling the boom to the landing mat allows for quick, low precision, and efficient unidirectional or bidirectional transfer of data between the UAV and a remote device. To accommodate such data transmission or transfer, the boom may include one or more additional conductors.

Figure 5A:
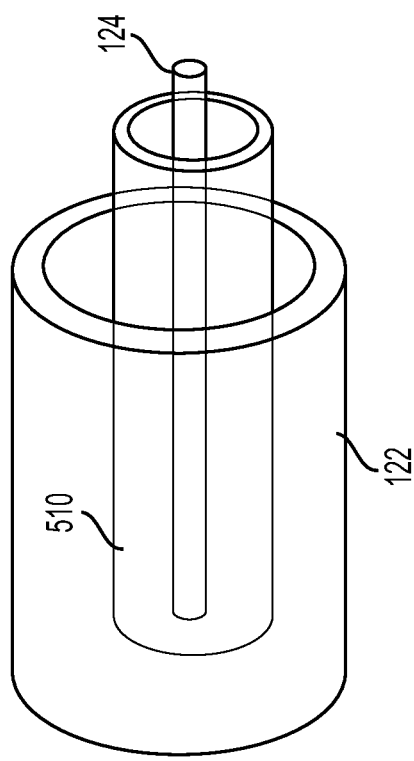
FIG. 5A is an example boom having three conductors.

FIG. 5A illustrates a boom having three conductors, inner conductor 124, outer conductor 122, and central conductor 510. In an example, the one or more additional conductors may be located coaxially with respect to the inner and outer conductors of the boom. In other examples, the ends of the conductors on the boom that couple with the charging mat are coaxially located, but the conductors attached to the end conductors need not be coaxially located. In the example shown in FIG. 5A, inner conductor 124, protrudes beyond the end of central conductor 510, which protrudes beyond the end of outer conductor 122. These additional conductors may be shielded from the other conductors in the boom through the use of an insulator or other dielectric material.

In other examples, the conductors are not coaxially aligned with respect to each other, but instead may encompass other geometric relationships. For example, inner conductor 124 may be a wire within any portion of outer conductor 122. In an example, inner conductor 124 and central conductor 510 may have any physical relationship inside outer conductor 122, including a twisting relationship, so long as the portion of the conductors couples with the corresponding electrode on the charging mat.

Figure 5B:
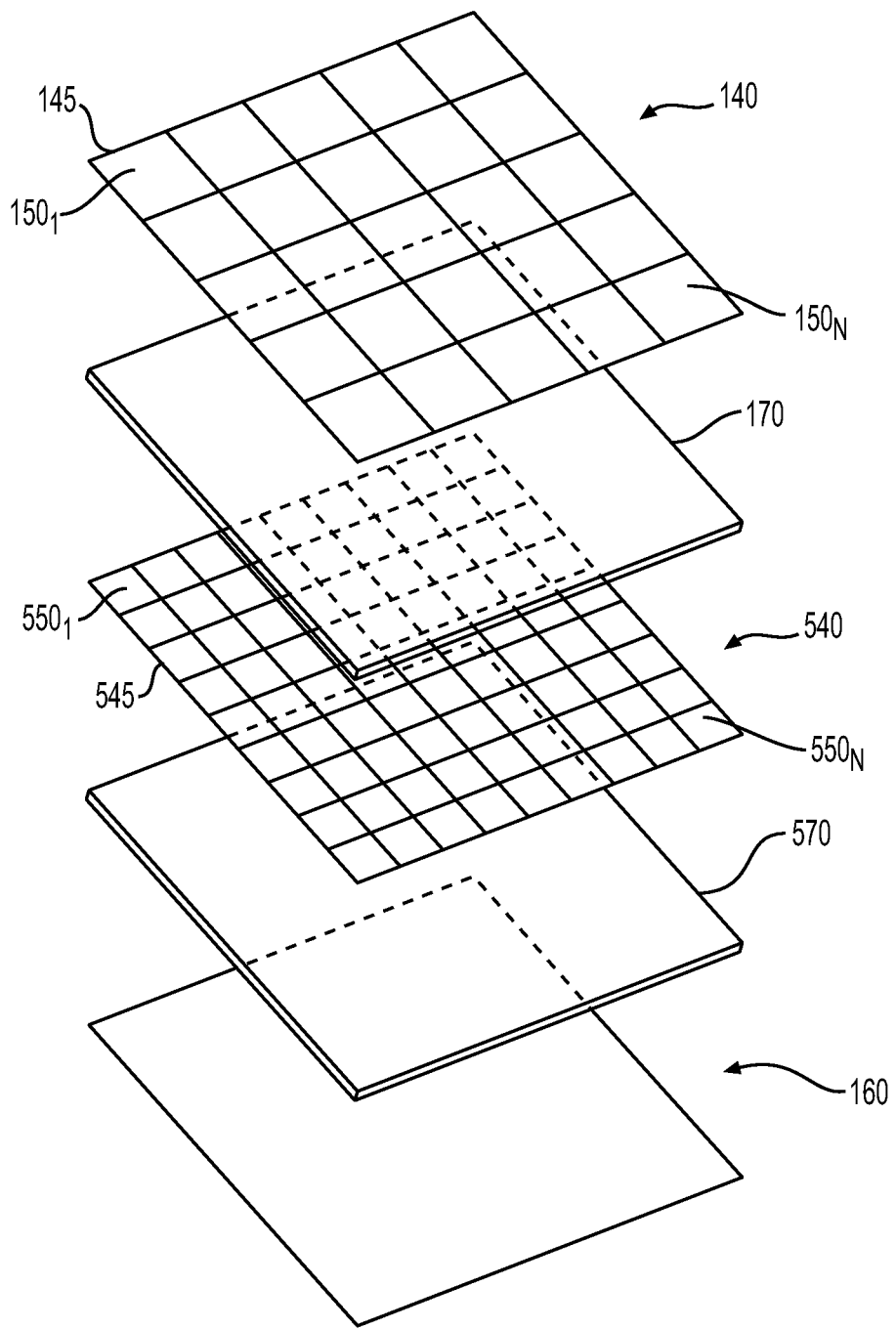
FIG. 5B is an example charging mat having three conductors for coupling with a boom having two or three conductors.

The charging mat can be modified to accommodate a UAV with a boom comprising more than two conductors as shown in FIG. 5B. In an example, top conductive mesh 140 may be stacked over another mesh 540 with a similar geometry, but smaller aperture. Mesh 140 and mesh 540 are separated by insolating core 170, and mesh 540 and bottom conductor 160 are separated by insolating core 570. In an example, the intervening conductive mesh 540 may have a different geometry than conductive mesh 140. Apertures $550_n$ in the intervening conductive mesh 540 may be of smaller surface area, and stacked or aligned over the apertures $150_n$ in top conductive mesh 140. The cross-sectional area of the mesh 140 and mesh 540 may be used as a parameter to select the respective conductor in the boom.

Figure 5C:
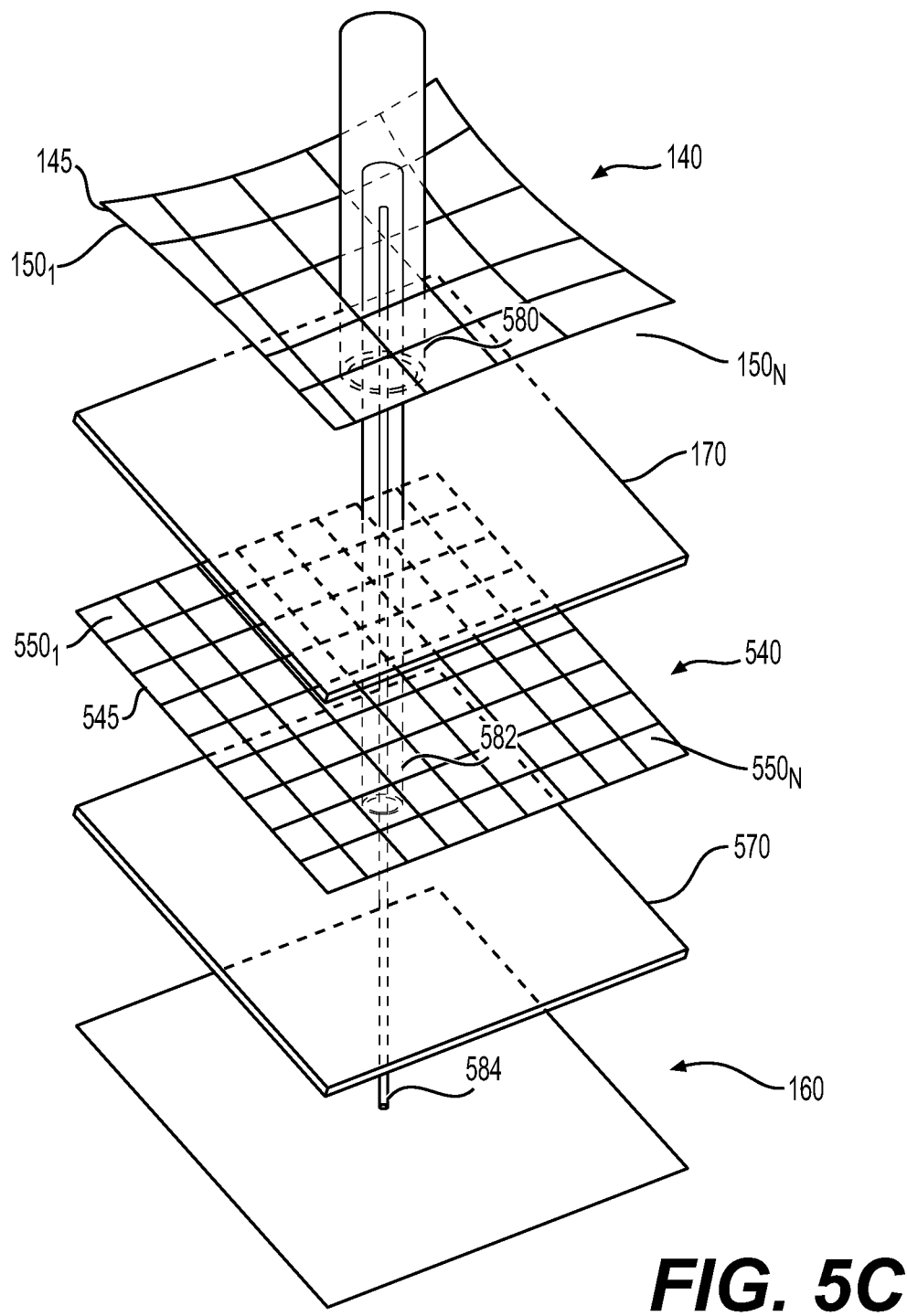
FIG. 5C is an example charging mat coupled to a boom having three conductors.

FIG. 5C illustrates a boom coupled to the various layers of charging mat. In this illustration, outer conductor 580 is coupled to conductive mesh 140, interior medial conductor 582 is couples to conductive mesh 540, and inner conductor 584 is coupled to bottom conductive layer 160. Selecting a particular conductive mesh layer or bottom conductor 140, 540, 160 selects the respective conductor 580, 582, 584 in the boom.

In an example, the boom may include up to N coaxial conductors, each conductor functioning as a data channel or as a conductor to charge the battery of the UAV. In the general case of N coaxial conductors, each adjacent conductor may have a decreasing radius so that N coaxial conductors are aligned within the core of the boom. The charging mat includes the respective number of mesh layers and isolating layers, and the size of the apertures in each mesh layer may be selected based on the radius of the conductors in the telescopic boom. Using this arrangement, a particular mesh layer may select a particular conductor (or data channel) in the boom.

In other embodiments, each boom may include only one conductor. In an example, the UAV may include two booms, each boom containing one conductor. In this case, one boom may couple with conductive mesh 140 and the other boom may couple with bottom conductor 160. In another example, the UAV may use more than two conductors for transfer of data and/or power with the charging mat. In this case, the UAV may include additional booms, one boom for each additional conductor. In still other examples, the UAV may include a boom that has two conductors and a boom that has one conductor, or other variations thereof.

In some examples, it may be desirable to transfer data or power in the form of direct current. Data may also be transferred as alternating current, or the combination of combination or multiplexing of alternating and direct current. For example, direct current and alternating current may be multiplexed in time and transferred to the UAV.

In other examples, the leads for the conductors of the boom may be disposed as discrete annular regions on the outside of the boom. Non-conductive or insulating regions may be disposed between the annular leads of the boom to create discrete leads to the conductors. In this example, each conductor of the boom is defined by the respective physical position of the conductor on the boom. This boom may be used with a complementary charging mat having stacked mesh electrodes geometrically separated by isolating cores. The dimensions of the conductive mesh electrodes and isolating cores may be determined by the dimensions of the leads and insulators on the core. When the charging mat is coupled to a boom in this example, a particular conductive mesh layer is coupled to, and thus selects, a particular conductor of the boom.

Figure 6A:
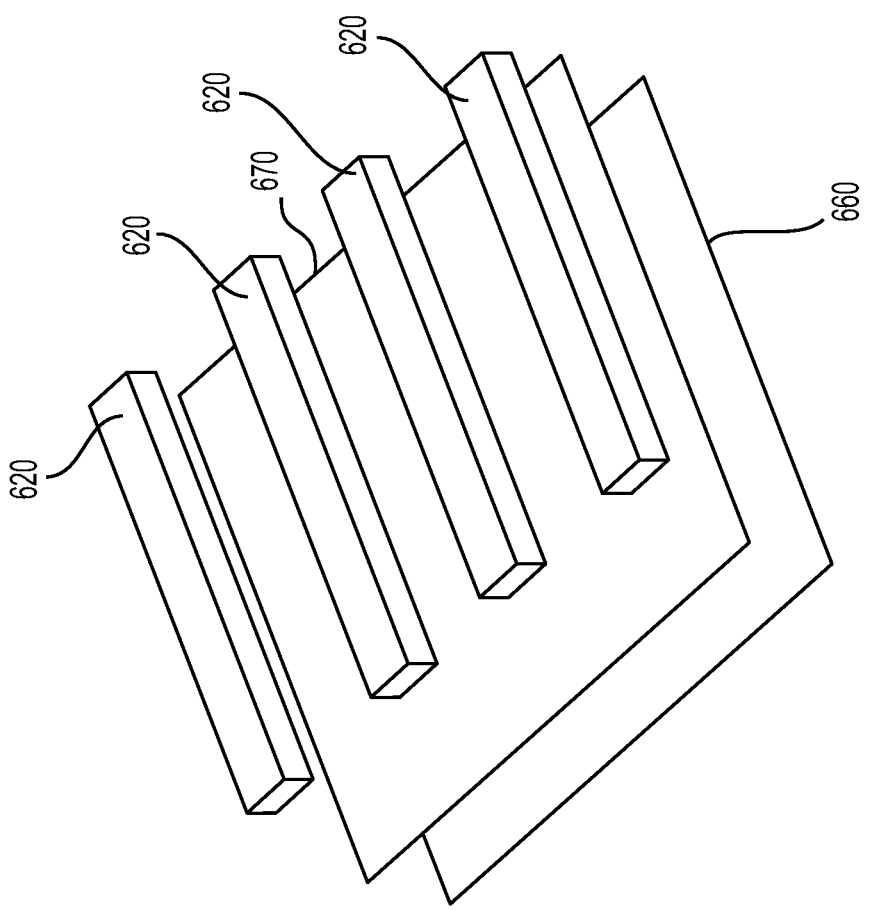
FIG. 6A is an example charging mat for coupling to the skids and a boom of a UAV.
Figure 6B:
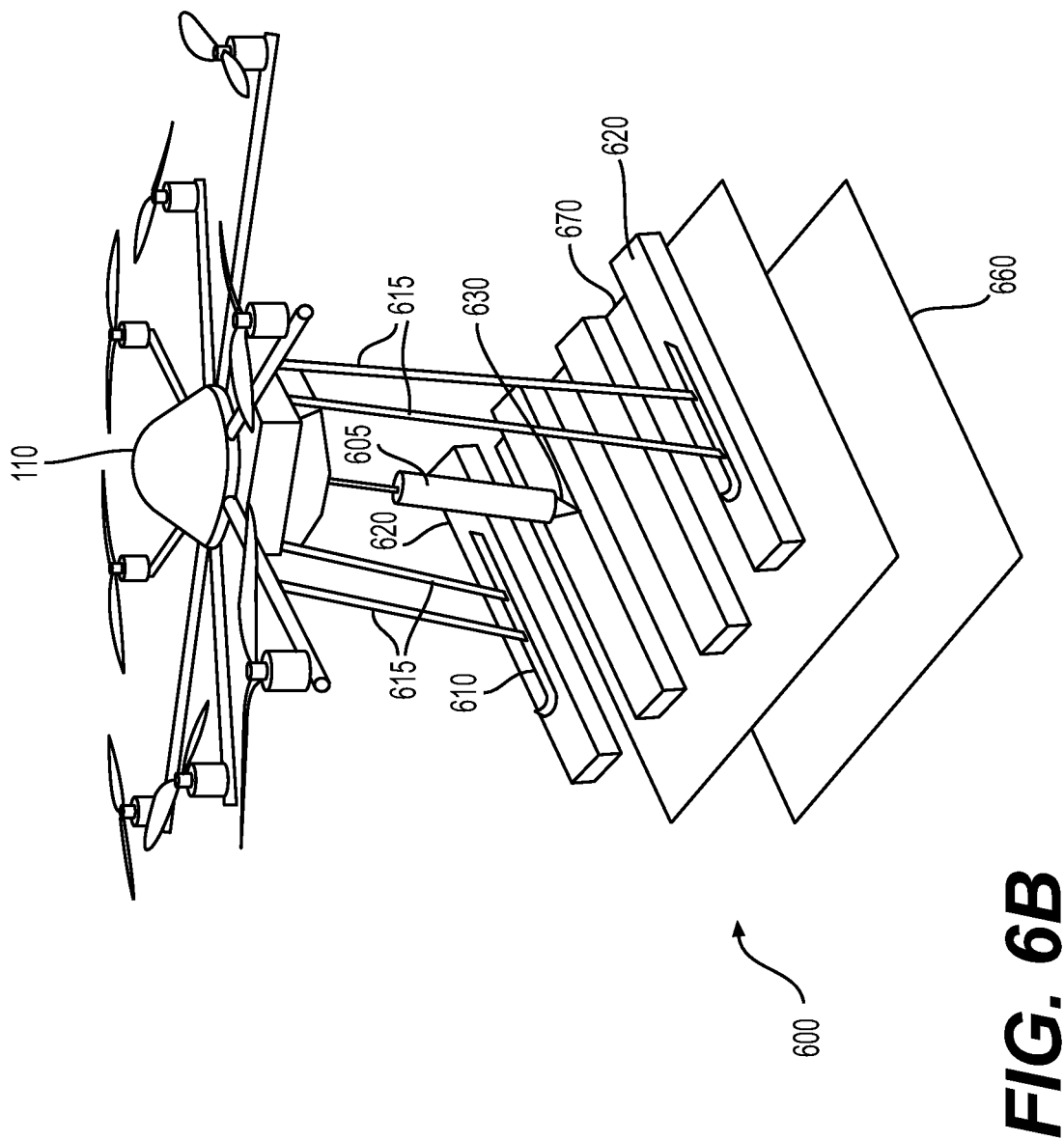
FIG. 6B is an example UAV coupled to a charging mat.

In still other examples shown in FIGS. 6A and 6B, a UAV can land on pads that function both as a landing pad and as an electrical lead. In this embodiment, the UAV can land on top of the charging mat with the electrode on the UAV contacting interconnected conductor 145. The boom can be lowered to contact bottom conductor for charging.

One example charging mat 600 for coupling to the landing skids of a UAV is shown in FIG. 6A. Charging mat 600 includes landing pads 620, bottom conductor 660 and isolating core 670. Landing pads 620 serve both as landing sites for UAV and as an electrical lead to UAV. Bottom conductor 660 serves the same function as bottom conductor 160 described previously. Isolating core 670 electrically separates landing pads 620 and bottom conductor 660.

FIG. 6B depicts a UAV 110 that has landed on charging mat 600. UAV 110 includes boom 605, and boom 605 includes conducting tip or lead 630. UAV 110 includes skids 610 and supports 615 connecting skids 610 to body of UAV 110. Skids 610 also function as an electrical lead coupling to landing pads 620 of charging mat 600. During or after landing of UAV 100 on charging mat 600, conducting tip 630 is extended through isolating core 670 and couples with bottom conductor 660.

In this case, the charging mat includes a plurality of raised platforms or landing pads 620 for supporting the UAV skids 610 during landing. The mat also includes bottom conductor 660 for coupling to conducting tip 630 of the UAV to provide power or transfer data. As shown in FIG. 6B, the UAV may extend boom 605 with conductor 630 to penetrate isolating core 670 to contact with bottom conductor 660. In other examples, the second lead of the UAV may be coupled to a conductive mesh located below the landing skid electrode.

Figure 6C:
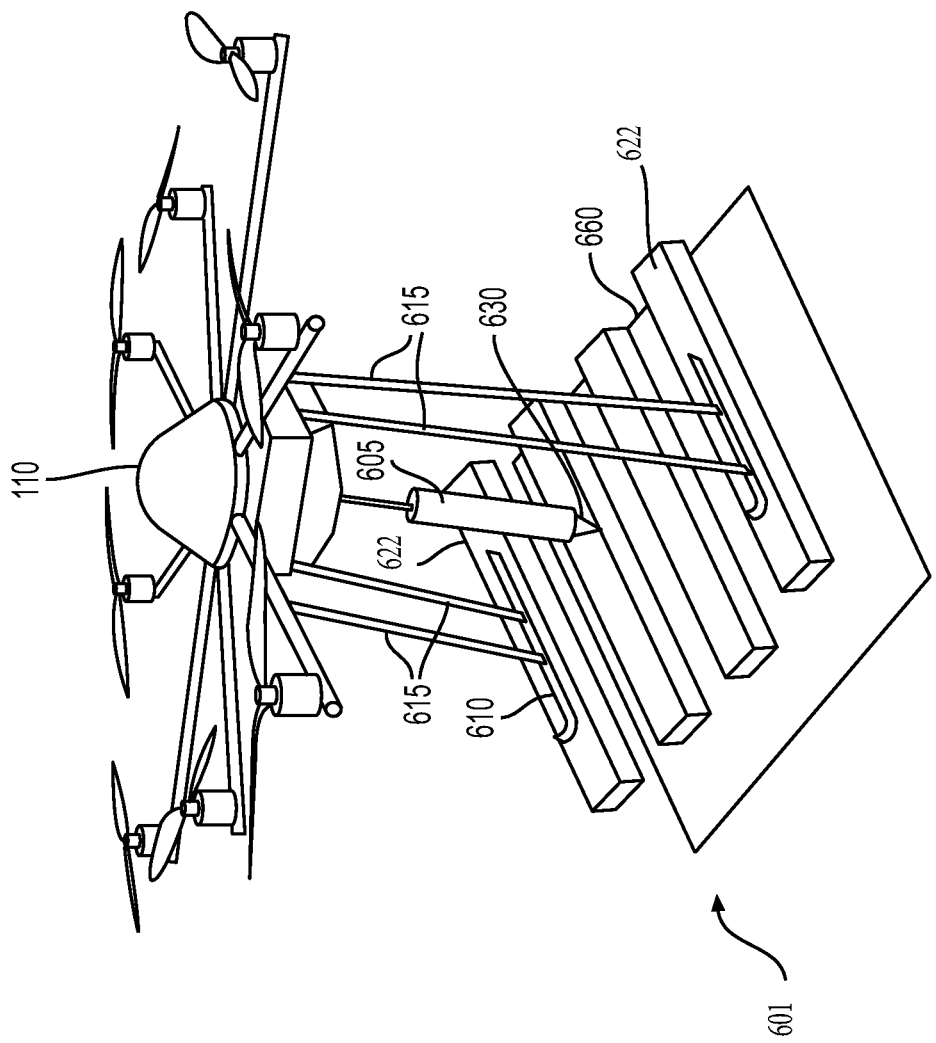
FIG. 6C is an example UAV coupled to a charging mat through a boom and at least one of the skids of the UAV.

In another example shown in FIG. 6C, the bottom surfaces of landing pads 622 may be coated with an insulating material. The insulating material isolates landing pads 622 from bottom conductor 660. In another example, the landing pad may include a thin film electrode on top of an insulating material. In the example shown in FIG. 6C, UAV 110 lands on landing pads 622, electrically coupling skids 610 to landing pads 622. Additionally, boom 605 is lowered between landing pads 620 until conducting tip 630 contacts bottom electrode 660, coupling conducting tip 630 to bottom electrode 660. After coupling the two electrical leads of UAV 110 to charging mat 601, the charging mat can be used to recharge the battery of UAV 110.

Figure 7:
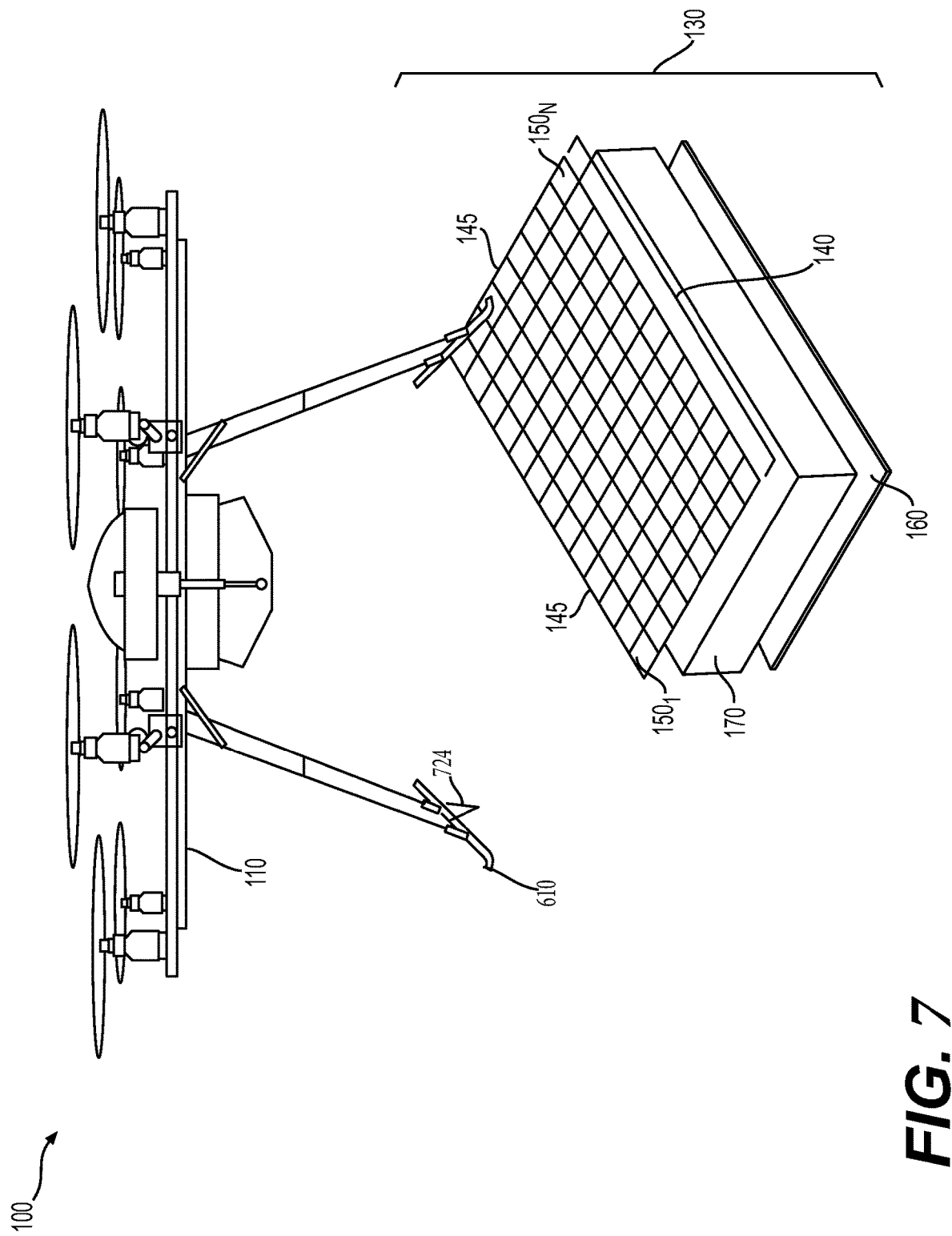
FIG. 7 is an example UAV preparing to couple to a charging mat through the skids of the UAV.

FIG. 7 illustrates an example of coupling a UAV to charging mat 130 via a landing skid for a low precision landing. The outer conductor of boom may be located on one (or both) of the skids (or landing pads) of the UAV. In this case, conducting tip 724 is integrated into landing skid 610 rather than into a boom as illustrated in FIG. 1. In the example shown in FIG. 7, one or both of the landing skids functions as an electrical lead coupling to interconnected conductors 145 of conductive mesh 140. Conducting tip 724 functions as the separate lead for contacting bottom electrode 160. During landing, conducting tip 724 penetrates through one of the apertures of conductive mesh 140 and isolating layer 170 before contacting bottom electrode 160.

To facilitate coupling of conducting tip 124 to bottom conductor 160, a biasing force may be applied to conducting tip 124 to enable conducting tip 124 to penetrate isolating core 170 before coupling to bottom electrode 160. In an example, an actuator may be located in the landing support arm for displacing conducting tip 724. In this fashion, the UAV can land on any one of the apertures for coupling to the charging mat.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    a charging mat configured to charge a battery of a vehicle, the charging mat including:
        a top conductor having pliable interconnected conductors arranged as a mesh and configured to engage a first conductor of a boom;
        a bottom conductor oriented substantially parallel to the top conductor and configured to engage a second conductor of the boom that is inserted through the mesh; and
        an isolating core disposed between the top conductor and the bottom conductor and configured to be penetrable by the second conductor, the isolating core comprising a solid material; and
    the boom including:
        the first conductor disposed on an exterior of the boom and configured to engage with the mesh;
        the second conductor disposed interior to the first conductor and configured to engage with the bottom conductor; and
        an isolating layer disposed between the first conductor and the second conductor.

2. The system of claim 1, wherein the bottom conductor is offset from the top conductor to form a gap and the isolating core is disposed between the gap, and wherein the isolating core is configured to electrically isolate the top conductor and the bottom conductor.

3. The system of claim 1, wherein the second conductor is disposed within the first conductor such that the second conductor does not extend beyond the first conductor when the second conductor is in a retracted position.

4. The system of claim 1, wherein portions of the mesh between the pliable interconnected conductors form a plurality of apertures, individual apertures of the plurality of apertures configured to engage the first conductor that is engaged with the mesh.

5. The system of claim 4, wherein:
    the first conductor is disposed on a first portion of the exterior of an elongated body of the boom, the elongated body having a core, and the first conductor coupled to the battery; and
    the second conductor is disposed in a second portion of the core of the elongated body, and the second conductor coupled to the battery.

6. The system of claim 5, further comprising an additional isolating core disposed on top of the mesh.

7. The system of claim 1, further comprising an actuator configured to apply a force to the boom to cause the second conductor to engage the bottom conductor.

8. A system comprising:
    a charging mat having an isolating core disposed between a top conductor and a bottom conductor, the isolating core comprising a solid material;
    a first conductor disposed on an exterior of a boom of a vehicle and connected to a battery of the vehicle, the first conductor configured to engage the charging mat; and
    a second conductor disposed in an interior of the boom and connected to the battery, the second conductor configured to engage the charging mat, and wherein the second conductor is electrically isolated from the first conductor.

9. The system of claim 8, wherein the first conductor is configured to engage at least one pliable interconnected conductor of a mesh of the charging mat and wherein the second conductor is configured to engage the bottom conductor of the charging mat when the second conductor is inserted through the mesh.

10. The system of claim 9, further comprising an actuator configured to at least one of:
    cause the second conductor to move relative to the first conductor; or
    apply a force to facilitate coupling between the second conductor and the bottom conductor.

11. The system of claim 8, wherein the second conductor is disposed within the first conductor such that the second conductor does not extend beyond the first conductor when the second conductor is in a retracted position.

12. The system of claim 8, wherein the second conductor is disposed within the first conductor such that the second conductor extends beyond the first conductor and an end of the second conductor has at least one of a conical or a spherical shape.

13. The system of claim 8, wherein at least one of the first conductor or the second conductor is configured to transmit data between the vehicle and the charging mat.

14. The system of claim 8, further comprising a third conductor configured to transmit data between the vehicle and a remote device.

15. A charging mat comprising:
    a top conductor having pliable interconnected conductors arranged as a mesh and configured to engage a first conductor of a boom of a vehicle;
    a bottom conductor oriented substantially parallel to the top conductor and configured to engage a second conductor of the boom that is inserted through the mesh, wherein the top conductor and the bottom conductor are coupled to a power supply; and
    an isolating core disposed between the top conductor and the bottom conductor and configured to accept the second conductor of the boom, the isolating core comprising a solid material.

16. The charging mat of claim 15, wherein portions of the mesh between the pliable interconnected conductors form a first plurality of apertures, individual apertures of the first plurality of apertures configured to engage the first conductor that is engaged with the mesh.

17. The charging mat of claim 16, wherein the isolating core further comprises a second plurality of apertures aligned with the first plurality of apertures and wherein the isolating core is configured to be penetrable by the second conductor.

18. The charging mat of claim 15, wherein the bottom conductor is offset from the top conductor to form a gap and wherein the isolating core is disposed in the gap.

19. The charging mat of claim 15, further comprising an adaptor configured to couple the top conductor and the bottom conductor to a power source.

20. The charging mat of claim 15, further comprising an additional isolating core disposed on top of the mesh.

* * * * *